(12) United States Patent
Hinzmann et al.

(10) Patent No.: US 12,692,359 B2
(45) Date of Patent: Jul. 28, 2026

(54) METHOD FOR RECOVERING RAW MATERIALS FROM POLYURETHANE FOAMS

(71) Applicant: Covestro Deutschland AG, Leverkusen (DE)

(72) Inventors: Dirk Hinzmann, Pulheim (DE); Sebastian Scherf, Leverkusen (DE); Michael Baecker, Korschenbroich (DE)

(73) Assignee: Covestro Deutschland AG, Leverkusen (DE)

( * ) Notice: Subject to any disclaimer, the term of this patent is extended or adjusted under 35 U.S.C. 154(b) by 473 days.

(21) Appl. No.: 18/264,592

(22) PCT Filed: Feb. 8, 2022

(86) PCT No.: PCT/EP2022/052931

§ 371 (c)(1),
(2) Date: Aug. 8, 2023

(87) PCT Pub. No.: WO2022/171586

PCT Pub. Date: Aug. 18, 2022

(65) Prior Publication Data

US 2024/0117144 A1 Apr. 11, 2024

(30) Foreign Application Priority Data

Feb. 9, 2021 (EP) .................................... 21155929
Sep. 3, 2021 (EP) .................................... 21194916

(51) Int. Cl.

| | |
|---|---|
| C08J 11/24 | (2006.01) |
| C08G 18/16 | (2006.01) |
| C08G 18/18 | (2006.01) |
| C08G 18/24 | (2006.01) |
| C08G 18/48 | (2006.01) |
| C08G 18/76 | (2006.01) |
| C08J 11/14 | (2006.01) |
| C08J 11/16 | (2006.01) |

(52) U.S. Cl.

CPC ............ C08J 11/24 (2013.01); C08G 18/163 (2013.01); C08G 18/1833 (2013.01); C08G 18/244 (2013.01); C08G 18/485 (2013.01); C08G 18/7621 (2013.01); C08J 11/14 (2013.01); C08J 11/16 (2013.01); C08G

*2110/0008* (2021.01); *C08G 2110/0083* (2021.01); *C08J 2375/04* (2013.01)

(58) Field of Classification Search
USPC ......................................................... 521/49.5
See application file for complete search history.

(56) References Cited

U.S. PATENT DOCUMENTS

| | | | |
|---|---|---|---|
| 4,336,406 A | | 6/1982 | Gerlock et al. |
| 5,714,523 A | * | 2/1998 | Hopper .................... C08J 11/10 |
| | | | 521/49 |
| 12,410,276 B2 | | 9/2025 | Vanbergen et al. |
| 2022/0251328 A1 | | 8/2022 | Steffens et al. |

FOREIGN PATENT DOCUMENTS

| | | | |
|---|---|---|---|
| CN | 102504331 A | 6/2012 | |
| EP | 0835901 A2 * | 4/1998 | ............. C08G 18/40 |

OTHER PUBLICATIONS

Simón, D. et al., Waste Management 2018, 76, pp. 147-171.
Braslaw, Jacob et al., Ind. Eng. Chem. Process Des. Dev. 1984, 23, pp. 552-557.
International Search Report PCT/EP2022/052931, date of mailing: May 9, 2022, Authorized officer: Ute Neugebauer.
René Rausch, The Periodic Table of the Elements online, retrieved Mar. 19, 2026, https://www.periodensystem-online.de/index.php?sel=abc&prop=pKb-Werte&show=list&el=92&id=acid.
Sodium Carbonate, EHS Support (Mar. 2021).

* cited by examiner

*Primary Examiner* — Terressa Boykin
(74) *Attorney, Agent, or Firm* — Donald R. Palladino

(57) ABSTRACT

The present invention relates to a method for recovering raw materials (i.e. of polyols and optionally additionally amines) from polyurethane foams, comprising chemolysis. The chemolysis is characterised in that a polyurethane foam is reacted with an alcohol and water in the presence of a catalyst at a temperature of between 130° C. and 195° C., the mass ratio of (total) alcohol and (total) water to the polyurethane foam [i.e. m(alcohol+water)/m(polyurethane foam), where "m"=mass] being between 0.5 and 2.5, and the mass of the water being between 4.0% and 10% of the mass of the alcohol. The catalyst comprises a metal salt selected from a carbonate, a hydrogen carbonate, an orthophosphate, a monohydrogen orthophosphate, a metaphosphate or a mixture of two or more of said metal salts.

16 Claims, No Drawings

METHOD FOR RECOVERING RAW MATERIALS FROM POLYURETHANE FOAMS

CROSS-REFERENCE TO RELATED APPLICATION

This application is a national stage application under 35 U.S.C. § 371 of PCT/EP2022/052931, filed Feb. 8, 2022, which claims the benefit of European Application No. 21155929.9, filed Feb. 9, 2021 and European Application No. 21194916.9, filed Sep. 3, 2021, each of which is incorporated herein by reference.

FIELD

The present invention relates to a process for recovering raw materials (i.e. polyols and optionally also amines) from polyurethane foams comprising a chemolysis. In the chemolysis a polyurethane foam is reacted with an alcohol and water in the presence of a catalyst at a temperature in the range from 130° C. to 195° C., wherein the mass ratio of (altogether employed) alcohol and (altogether employed) water on the one hand to the polyurethane foam on the other hand [i.e. m(alcohol+water)/m(polyurethane foam) where "m"=mass] is in the range from 0.5 to 2.5 and wherein the mass of the water is 4.0% to 10% of the mass of alcohol. The catalyst comprises a metal salt selected from a carbonate, a hydrogencarbonate, an orthophosphate, a monohydrogen orthophosphate, a metaphosphate or a mixture of two or more of the aforementioned metal salts. It is also possible to initially mix only the alcohol and the catalyst with the polyurethane foam while the water is successively added only after dissolution of the polyurethane foam. It is also possible to add a portion of the water together with the alcohol and the catalyst at commencement of the chemolysis and to add the remaining amount of water successively once the polyurethane foam has dissolved.

BACKGROUND

Polyurethane foams enjoy a variety of applications in industry and in everyday life. Distinctions are typically made between polyurethane foams and what are known as "CASE" products, with "CASE" being a collective term for polyurethane coatings (e.g., paints), adhesives, sealants and elastomers. The polyurethane foams are typically divided into rigid foams and flexible foams. Common to all of these products in spite of their heterogeneity is the basic polyurethane structure, which is formed by the polyaddition reaction of a polyfunctional isocyanate and of a polyol and which in the case, for example, of a polyurethane based on a diisocyanate $O\!\!=\!\!C\!\!=\!\!N\!\!-\!\!R\!\!-\!\!N\!\!=\!\!C\!\!=\!\!O$ and a diol $H\!\!-\!\!O\!\!-\!\!R'\!\!-\!\!O\!\!-\!\!H$ (where R and R' denote organic radicals) may be represented as $$\sim\!\!\sim\![O\!\!-\!\!R'\!\!-\!\!O\!\!-\!\!(O\!\!=\!\!C)\!\!-\!\!HN\!\!-\!\!R\!\!-\!\!NH\!\!-\!\!(C\!\!=\!\!O)]\sim\!\!\sim.$$

It is precisely the great economic success of polyurethane products that is responsible for the large amounts of polyurethane waste generated (for example from old mattresses or seating furniture) that must be sent to a sensible use. The mode of reuse that is the easiest to implement technically is that of incineration, with the heat of combustion released being utilized for other processes, examples being industrial processes. However, this does not allow raw material loops be closed. Another mode of reuse is so-called "physical recycling", which sees polyurethane wastes mechanically comminuted and used in the production of new products. This type of recycling naturally has limits and there has therefore been no lack of attempts to recover the basic raw materials of polyurethane production by retrocleavage of the polyurethane bonds (so-called "chemical recycling"). These raw materials to be recovered comprise primarily polyols (i.e., in the example above, $H\!\!-\!\!O\!\!-\!\!R'\!\!-\!\!O\!\!-\!\!H$). In addition, it is also possible through hydrolytic cleavage of the urethane bond to recover amines (i.e., in the example above, $H_2N\!\!-\!\!R\!\!-\!\!NH_2$) which can be phosgenated to afford isocyanates (in the aforementioned example to afford $O\!\!=\!\!C\!\!=\!\!N\!\!-\!\!R\!\!-\!\!N\!\!=\!\!C\!\!=\!\!O$) after workup.

A variety of chemical recycling approaches have been developed in the past. The three most important are briefly summarized as follows:

1. Hydrolysis of urethanes by reaction with water to recover amines and polyols with formation of carbon dioxide.
2. Glycolysis of urethanes by reaction with alcohols, wherein the polyols incorporated in the urethane groups are replaced by the alcohol employed and thus liberated. This process is commonly referred to in the literature as transesterification (more accurately: transurethanization). Regardless of the exact nature of the alcohol used, this mode of chemical recycling is dubbed glycolysis in the literature, a term that really applies only for glycol. In the context of the present invention the term alcoholysis is thus generally used. A glycolysis may be followed by a hydrolysis. If the hydrolysis is performed in the presence of the still-unchanged glycolysis mixture, this is referred to as a
3. Hydroglycolysis of urethane bonds by reaction with alcohols and water. It is of course likewise possible to add alcohol and water from the start, in which case the above-described processes of glycolysis and hydrolysis proceed in parallel.

A summary of the known methods of polyurethane recycling is offered by the review article by Simón, Borreguero, Lucas and Rodriguez in *Waste Management* 2018, 76, 147-171 [1]. The article highlights glycolysis (2. above) as particularly significant. In glycolysis, a differentiation is made between "biphasic" and "monophasic" regimes depending on whether the obtained crude product of the reaction with the alcohol separates into two phases or not. This depends in particular on the choice of alcohol used and and the process conditions (especially the proportion of alcohol used in the reaction mixture and temperature). The aforementioned review article favors the biphasic regime using crude glycerol (wastes from biodiesel production for instance) since it is said to have the greatest potential to recover high-quality products at low production costs (wherein recovery of the polyols is clearly the focus).

As a result of the additional use of water the product of hydroglycolyses (3. above) is always biphasic. Braslaw and Garlock, *Ind. Eng. Chem. Process Des. Dev.* 1984, 23, 552-557 [2] describes the workup of such a product comprising removal of the water (by laboratory-scale phase separation or by evaporation in a process recommended for industrial scale applications and known as the "Ford Hydroglycolysis Process") and extraction of the remaining organic phase with hexadecane to form an alcohol phase, from which amine can be recovered, and a hexadecane phase, from which polyol can be recovered. Though mentioning the option of recovering amine, the emphasis in this article too is on recovering polyols.

A patent for a process operating on these principles was granted under number U.S. Pat. No. 4,336,406. Described therein is a process for recovering polyether polyol from a polyurethane comprising the steps of:

(a) forming a solution by dissolving this polyurethane in a saturated alcohol having a boiling point of 225° C. to 280° C. at a temperature of 185° C. to 220° C. in a nonoxidizing atmosphere;

(b) reacting this solution with water for the required time in this nonoxidizing atmosphere in the presence of an alkali metal hydroxide catalyst to largely hydrolyze the hydrolyzable dissolution products to amines and alcohol while holding this solution at a temperature of 175° C. to 220° C., wherein this alkali metal hydroxide catalyst is added to the solution in an amount in the region of at least 0.1% by mass based on the mass of this polyurethane foam;

(c) removing the water remaining after the hydrolysis from this solution in a nonoxidizing atmosphere;

(d) extracting this polyol from the hydrolyzed solution in a nonoxidizing atmosphere with an alkane that is substantially immiscible with this alcohol and has a boiling point of 230° C. to 300° C. (especially hexadecane); and (e) subjecting the extracted polyol to a vacuum purification at a temperature below 230° C.

In step (a), the polyurethane is reacted with the alcohol groups of the saturated alcohol to form polyols, ureas and carbamates (see column 3 lines 42 to 46).

In step (b), water and alkali metal hydroxide catalyst are added to the solution obtained in step (a), either separately or in the form of an aqueous catalyst solution, to effect decomposition of carbamates and ureas into amines and alcohol. Steps (a) and (b) may be altogether be described as hydroglycolysis (more accurately: hydroalcoholysis) with staggered addition of alcohol and water. Water is added in such an amount that the solution boils at temperatures between 175° C. and 200° C. In the case of diethylene glycol as the alcohol, the water is added in an amount between 2.4% and 0.6%, preferably 1.1%, of the mass of employed diethylene glycol (see column 4 lines 39 to 46). Water consumed in the hydrolysis is replaced by addition of further water in order to keep the water content constant. Once the hydrolysis is complete the employed water requires removal in step (c) (column 5, lines 31 to 33) before the extraction in step (e) can be carried out.

Only a few of the chemical recycling processes known from the literature are in sustained operation on an industrial scale; many have not even reached pilot scale [1]. In view of generally increased environmental awareness and increased efforts to configure industrial processes to be as sustainable as possible—both of which are fundamentally in favor of chemical recycling—this shows clearly that the chemical recycling of polyurethane products is still by no means mature from a technical and economic point of view. Challenges exist particularly with regard to the purity of the products recovered. Polyols must be recovered without amine impurities if at all possible, in order, for instance, not to adversely affect foaming characteristics in the case of reuse in the production of polyurethane foams. If another aim is recovery of amines, these must of course also be obtained in maximum purity. In addition, the polyurethane products to be reutilized usually still contain various auxiliaries and additives (stabilizers, catalysts and the like), which have to be separated from the actual target products of the recycling and disposed of in an economically viable and environmentally benign manner. Moreover, an economic recycling process must ensure that the reagents used (for example alcohols used) can be recovered and reused (i.e. follow a closed loop) as completely as possible. Due to the large volumes of polyurethane waste generated from used polyurethane foams (for example mattresses, seating furniture, vehicle seats and the like), the recycling of polyurethane foams is of particular importance.

There is therefore a need for further improvements in the field of chemical recycling of polyurethane foams. It would especially be desirable to be able to recover polyols and preferably also amines in high purity and efficiently from polyurethane foams, especially in a manner that would make industrial scale use economically worthwhile. It would additionally be desirable to have an available outlet for the auxiliaries and additives present in the polyurethane products which is acceptable from an economic and environmental point of view.

Taking this requirement into account the present invention provides a process for recovering raw materials (i.e. polyols and optionally also amines) from polyurethane foams, comprising the steps of (A) [preparing the chemolysis] providing a polyurethane foam based on an isocyanate component and a polyol component;

(B) [performing the chemolysis] chemolysis of the polyurethane foam with an alcohol and water in the presence of a catalyst at a temperature in the range from 130° C. to 195° C., preferably in the range from 135° C. to 190° C., particularly preferably in the range from 140° C. to 190° C. and most preferably in the range from 165° C. to 185° C., wherein the mass ratio of (altogether employed) alcohol and (altogether employed) water on the one hand to the polyurethane foam on the other hand [i.e. $m(\text{alcohol}+\text{water})/m(\text{polyurethane foam})$, wherein "m" stands for mass] is in the range from 0.5 to 2.5 and the mass of the water is 4.0% to 10% of the mass of the alcohol, to obtain a first product mixture containing (at least) one amine corresponding to an isocyanate of the isocyanate component, polyols (namely the polyols making up the polyol component and/or polyols optionally formed from the original polyol component during reaction with the alcohol), (superstoichiometrically employed and thus incompletely converted) alcohol and (superstoichiometrically employed and thus incompletely converted) water;

wherein the catalyst comprises a metal salt selected from a carbonate, a hydrogencarbonate, an orthophosphate, a monohydrogen orthophosphate, a metaphosphate or a mixture of two or more of the aforementioned metal salts (preferably consists thereof);

(C) [separating polyol and amine] working up the first product mixture to obtain a polyol phase containing the polyols and an amine phase containing the amine, water and the alcohol;

(D) [isolating the polyol] recovering the polyols from the polyol phase; and (E) [isolating the amine] optionally (and preferably) recovering the amine from the amine phase.

It has been surprisingly been found that both the transurethanization by reaction of the urethane groups with the alcohol and the subsequent in-situ hydrolysis of the carbamate intermediate by the reaction thereof with water may be catalyzed with one and the same of the recited catalysts. The recited catalyst have the feature that they are not deactivated by carbonization by the carbon dioxide formed during the reactions and thus catalyse both the transurethanization and the hydrolysis.

DETAILED DESCRIPTION

Polyurethane foams in the context of the present invention are the polyaddition products (occasionally also referred to, albeit not entirely correctly, as polycondensation products) formed by reaction of polyfunctional isocyanates (=isocyanate component in polyurethane production) with polyols (=polyol component in polyurethane production) in the presence of a blowing agent. Polyurethane foams generally contain not only the polyurethane basic structure outlined above but also other structures, for example structures having urea bonds. The presence of such structures diverging from the pure polyurethane basic structure in addition to polyurethane structures does not depart from the scope of the present invention.

In the terminology of the present invention, the term isocyanates encompasses all isocyanates known to a person skilled in the art in connection with polyurethane chemistry, such as, in particular, tolylene diisocyanate (TDI; produced from tolylenediamine, TDA), the di- and polyisocyanates of the diphenylmethane series (MDI; produced from the di- and polyamines of the diphenylmethane series, MDA), pentane 1,5-diisocyanate (PDI; produced from pentane-1,5-diamine, PDA), hexamethylene 1,6-diisocyanate (HDI; produced from hexamethylene-1,6-diamine, HDA), isophorone diisocyanate (IPDI; produced from isophoronediamine, IPDA) and xylylene diisocyanate (XDI; produced from xylylenediamine, XDA). The expression "an isocyanate" naturally also encompasses embodiments in which two or more different isocyanates (e.g. mixtures of MDI and TDI) were used in the production of the polyurethane product, unless explicitly stated otherwise, for instance by the wording "precisely one isocyanate". The entirety of all isocyanates employed in the production of the polyurethane product is referred to as the isocyanate component (of the polyurethane foam). The isocyanate component comprises at least one isocyanate. Analogously, the entirety of all polyols used in the production of the polyurethane foam is referred to as the polyol component (of the polyurethane foam). The polyol component comprises at least one polyol.

In the terminology of the present invention, the term polyols encompasses all polyols known to a person skilled in the art in connection with polyurethane chemistry, such as, in particular, polyether polyols, polyester polyols, polyetherester polyols and polyethercarbonate polyols. The expression "a polyol" naturally also encompasses embodiments in which two or more different polyols were employed in the production of the polyurethane product. Therefore, if reference is made, for example, to "a polyether polyol" (or "a polyester polyol" etc.), this terminology naturally also encompasses embodiments in which two or more different polyether polyols (or two or more different polyester polyols etc.) were employed in the production of the polyurethane foam.

Carbamates in the terminology of the present invention are the urethanes formed in step (B) by the reaction with the alcohol.

An amine corresponding to an isocyanate is the amine that can be phosgenated to obtain the isocyanate according to $R—NH_2+COCl_2 \rightarrow R—N=C=O+2HCl$. Analogously, a nitro compound corresponding to an amine is the nitro compound that can be reduced to obtain the amine according to $R—NO_2+3H_2 \rightarrow R—NH_2+2H_2O$.

In the context of the process according to the invention water and alcohol are employed in superstoichiometric amounts. This is to be understood as meaning that water is employed in an amount that is theoretically sufficient to hydrolyze all of the polyurethane bonds to afford amines an polyols by liberation of carbon dioxide. Similarly, the use of superstoichiometric amounts of alcohol is to be understood as meaning that said alcohol is employed in an amount that is theoretically sufficient to convert all of the polyurethane bonds to form carbamates of the alcohol and polyols. When employing the mass fractions of water and alcohol demanded according to the invention both of the above are regularly the case.

The wording "chemolysis of the polyurethane foam with an alcohol and water and in the presence of a catalyst" does not necessarily imply that all of the water to be employed in step (B) need immediately be added at commencement of step (B). On the contrary, embodiments in which at commencement of step (B) initially no water or only a portion of the water is added and the water/the remaining water is added successively during the reaction duration are encompassed by the invention. In this case the specified amount of 4.0% to 10%, preferably 5.0% to 7.0%, of the mass of the alcohol refers to the amount of water added before the end of the reaction duration of step (B). It is in principle also conceivable to add the alcohol or an alcohol-water mixture successively. In any case the specified amounts in connection with step (B) relate to the total amount added in each case until the end of the reaction duration of this step.

The quantitative indications in respect of water in step (B) refer to the water added as a reagent for the hydrolytic carbamate cleavage. Any quantities of water already present from moisture in the employed alcohol and/or in the employed polyurethane foam are low in comparison. Moisture in the employed alcohol/in the employed polyurethane foam is to be understood as meaning moisture traces such as can occur on an industrial scale. It is naturally possible to premix the alcohol with water to be employed for the hydrolytic carbamate cleavage or to wet the polyurethane foam with water to be employed for the hydrolytic carbamate cleavage. Such embodiments do not depart from the scope of the invention and water added in this way is naturally to be taken into account in the quantitative indications of step (B), i.e. the quantity of water additionally to be added if required is to be reduced correspondingly. If the catalyst is employed as an aqueous solution the water employed as a solvent is likewise to be taken into account in the quantitative indications of step (B), i.e. the quantity of water additionally to be added if required is to be reduced correspondingly.

The invention comprises carrying out the "chemolysis of the polyurethane foam with an alcohol and water in the presence of a catalyst [ . . . ], wherein the catalyst comprises a metal salt selected from a carbonate, a hydrogencarbonate, an orthophosphate, a monohydrogen orthophosphate, a metaphosphate or a mixture of two or more of the aforementioned metal salts (preferably consists thereof)". Thus, according to the invention, at commencement of step (B) the polyurethane foam is mixed with alcohol or an alcohol-water mixture and at least one of the recited metal salts to obtain a reaction mixture which is subsequently reacted at temperatures in the aforementioned ranges, if required (provided water is not already added in its entirety in the mixing step) with addition of water.

Orthophosphates are the salts of orthophosphoric acid, $H_3PO_4$, where all protons have been eliminated ($=PO_4^{3-}$). Monhydrogen orthophosphates are the salts of orthophosphoric acid where two protons have been eliminated ($=HPO_4^{2-}$). Metaphosphates are condensation products of orthophosphoric acid having the empirical formula $[(PO_3)^-]_n$, wherein n represents a natural number (especially 3 or 4).

There will initially follow a brief summary of various possible embodiments of the invention:

In a first embodiment of the invention, which may be combined with all other embodiments, the isocyanate component comprises an isocyanate selected from tolylene diisocyanate (TDI; produced from tolylenediamine, TDA), the di- and polyisocyanates of the diphenylmethane series (MDI; produced from the di- and polyamines of the diphenylmethane series, MDA), pentane 1,5-diisocyanate (PDI; produced from pentane-1,5-diamine, PDA), hexamethylene 1,6-diisocyanate (HDI; produced from hexamethylene-1,6-diamine, HDA), isophorone diisocyanate (IPDI; produced from isophoronediamine, IPDA), xylylene diisocyanate (XDI; produced from xylylenediamine, XDA) or a mixture of two or more of the aforementioned isocyanates.

In a second embodiment of the invention, which is a particular configuration of the first embodiment, the isocyanate component comprises tolylene diisocyanate or a mixture of tolylene diisocyanate and the di- and polyisocyanates of the diphenylmethane series.

In a third embodiment of the invention, which is a particular configuration of the second embodiment, the isocyanate component comprises tolylene diisocyanate.

In a fourth embodiment of the invention, which is a particular configuration of the third embodiment, the isocyanate component comprises no further isocyanates in addition to tolylene diisocyanate.

In a fifth embodiment of the invention, which may be combined with all other embodiments, the polyol component comprises a polyether polyol, a polyester polyol, a polyetherester polyol, a polyacrylate polyol and/or a polyethercarbonate polyol. The polyol component is preferably a polyether polyol. More preferably, the polyol component is a polyether polyol (i.e. does not contain any polyols other than polyether polyols; but a mixture of two or more different polyether polyols is encompassed and does not leave the scope of this embodiment).

In a sixth embodiment of the invention, which may be combined with all other embodiments, the polyol component comprises a styrene-acrylonitrile copolymer-filled polyether polyol.

In a seventh embodiment of the invention, which may be combined with all other embodiments, the alcohol is selected from methanol, ethanol, ethylene glycol, diethylene glycol, propylene glycol, dipropylene glycol, methyl glycol, triethylene glycol, glycerol, 2-methylpropane-1,3-diol or a mixture of two or more of the aforementioned alcohols.

In an eighth embodiment of the invention, which may be combined with all other embodiments, the metal salt is a salt of an alkali metal or an alkaline earth metal.

In a ninth embodiment of the invention, which may be combined with all other embodiments, the metal salt comprises a carbonate, a hydrogencarbonate, a monohydrogen orthophosphate, an orthophosphate or a mixture of two or more of the aforementioned metal salts.

In a tenth embodiment of the invention, which is a special configuration of the ninth embodiment, the metal salt comprises only one of the recited metal salts and preferably comprises no further metal salts.

In an eleventh embodiment of the invention, which may be combined with all other embodiments, the mass ratio of (altogether employed) alcohol and (altogether employed) water on the one hand to polyurethane foam on the other hand [m(alcohol+water)/m(polyurethane foam)] is in the range from 1.0 to 1.3.

In a twelfth embodiment of the invention, which may be combined with all other embodiments, in particular with the eleventh embodiment, the mass of the water is 5.0% to 7.0% of the mass of the alcohol.

In a thirteenth embodiment of the invention, which may be combined with all other embodiments, the reaction in step (B) is performed for a reaction duration of 1.0 h to 10 h, preferably 1.5 h to 7.5 h, particularly preferably 2.0 h to 6.0 h and very particularly preferably 2.5 h to 5.5 h.

In a fourteenth embodiment of the invention, which is a special configuration of the thirteenth embodiment, in step (B) initially only the alcohol and the catalyst are mixed with the polyurethane foam and the water is added in the further course of step (B) spread over the reaction duration, or in step (B) initially the alcohol, the catalyst and 2% to 4% of the amount of water altogether to be employed in step (B) are mixed with the polyurethane foam and the remaining amount of water is added in the further course of step (B) spread over the reaction duration. The duration over which the water is added is in both alternatives in particular 1.0 hours to 5.0 hours; the last water addition is thus carried out before the end of the previously defined reaction duration.

In a fifteenth embodiment of the invention, which may be combined with all other embodiments, step (B) is performed at a pressure in the range from 900 $mbar_{(abs.)}$ to 1800 $bar_{(abs.)}$, in particular at ambient pressure.

In a sixteenth embodiment of the invention, which may be combined with all other embodiments, the catalyst is added in such an amount that the mass thereof corresponds to 0.1% to 3.5% of the mass of the polyurethane foam employed in step (B).

In a seventeenth embodiment of the invention, which may be combined with all other embodiments, except for the eighteenth and nineteenth embodiments specified below, step (C) comprises:

phase separation of the first product mixture into the polyol phase and into the amine phase.

In an eighteenth embodiment of the invention, which is an alternative to the seventeenth and below-mentioned nineteenth embodiment, but may otherwise be combined with all other embodiments, step (C) comprises:

combining the first product mixture with an organic solvent that is not completely miscible with the alcohol employed in step (B) and phase separation into the polyol phase and into the amine phase.

In a nineteenth embodiment of the invention, which is an alternative to the seventeenth and eighteenth embodiment but may otherwise be combined with all other embodiments, step (C) comprises:

(C.I) mixing the first product mixture obtained in step (B) with an organic solvent that is miscible with the alcohol employed in step (B) to obtain a second product mixture and (C.II) Washing the second product mixture obtained in step (C.I) with an aqueous washing liquid and phase separation into the amine phase and into the polyol phase.

In a twentieth embodiment of the invention, which may be combined with all other embodiments, step (D) comprises a distillation and/or stripping with a stripping gas (such as especially nitrogen or steam, preferably nitrogen).

In a twenty-first embodiment of the invention, which may be combined with all other embodiments, step (E) is performed and comprises a distillative removal of alcohol and water from the amine phase followed by a distillative purification of the amine remaining after the distillative removal.

The embodiments briefly outlined above and further possible configurations of the invention are more particularly elucidated hereinbelow. All of the above-described embodiments and the further configurations of the invention described below may be combined among one another and with one another as desired unless the opposite is clearly apparent from the context to a person skilled in the art or is expressly stated.

Providing the Polyurethane Foam for Chemical Recycling

Step (A) of the process according to the invention comprises providing the polyurethane foam to be chemically recycled in preparation for the chemolysis.

The polyurethane foam may in principle be of any kind; in particular, both flexible foams and rigid foams are suitable, preference being given to flexible foams (for example from used mattresses, furniture cushioning or car seats). Such polyurethane foams are typically produced using pentane, chlorofluorocarbons, dichloromethane and/or carbon dioxide as blowing agents.

In addition, preference is given to polyurethane foams that are based, with regard to the isocyanate component, on an isocyanate selected from tolylene diisocyanate (TDI), the di- and polyisocyanates of the diphenylmethane series (MDI), pentane 1,5-diisocyanate (PDI), hexamethylene 1,6-diisocyanate (HDI), isophorone diisocyanate (IPDI), xylylene diisocyanate (XDI) and mixtures of two or more of the aforementioned isocyanates.

Particular preference is given to polyurethane foams that are based, with regard to the isocyanate component, on a mixture of TDI and MDI. Very particular preference is given to polyurethane products that are based, with regard to the isocyanate component, solely on TDI.

With regard to the polyol component, preference is given to polyurethane foams that are based on a polyol selected from a polyether polyol, a polyester polyol, a polyetherester polyol, a polyethercarbonate polyol, a polyacrylate polyol or a mixture of two or more of the aforementioned polyols. The polyol component is preferably a polyether polyol. More preferably, the polyol component is a polyether polyol (i.e. does not contain any polyols other than polyether polyols; but a mixture of two or more different polyether polyols is encompassed and does not leave the scope of this embodiment). The polyether polyol may also be one that is filled with a styrene-acrylonitrile copolymer (SAN copolymer). It is one of the advantages of the invention that it may also be used on such polyol components. The challenge in the chemolysis of polyurethane foams whose polyol component is based on SAN copolymer-filled polyether polyols is that the SAN copolymer is released as finely divided polymer particles during the chemolysis. This applies regardless of the selected chemolysis process. The SAN polymer present as finely divided polymeric particles in the reaction mixture leads to problems in the subsequent separation by extractive processes for example. Furthermore, due to the fineness of the polymer particles, filtration is hardly possible since the filter quickly becomes blocked and further removal is no longer possible. The advantage of the hydroalcoholysis according to the invention is that after its liberation from the polyether polyol the SAN polymer is partially brought into a soluble form by the hydrolysis, thus allowing the workup of the reaction mixture after the chemolysis by extraction to proceed without issue.

Most preferably, the polyurethane foam is a foam wherein the isocyanate component contains tolylene diisocyanate (TDI) and di- and polyisocyanates of the diphenylmethane series (MDI), especially TDI only, and wherein the polyol component contains a polyether polyol (and in particular is a polyether polyol, i.e. does not contain any further polyols other than polyether polyols, although a mixture of two or more different polyether polyols is included and does not depart from the scope of this embodiment).

Preferably, even step (A) comprises preparatory steps for the cleavage of the urethane bonds in step (B.II). These are especially mechanical comminution of the polyurethane foams. Such preparatory steps are known to a person skilled in the art; reference is made by way of example to the literature cited in [1]. Depending on the characteristics of the polyurethane foam, it can be advantageous to "freeze" it before the mechanical comminution in order to facilitate the comminuting operation.

Before, during or after the mechanical comminution the polyurethane foam may be subjected to treatment with aqueous or alcoholic disinfectants. Such disinfectants are preferably hydrogen peroxide, chlorine dioxide, sodium hypochlorite, formaldehyde, sodium N-chloro-(4-methylbenzene)sulfonamide (Chloramine T) and/or peracetic acid (aqueous disinfectants) or ethanol, isopropanol and/or 1-propanol (alcoholic disinfectants).

It is also conceivable to conduct the above-described preparatory steps at a location spatially separate from the location of the chemolysis. In that case, the prepared foam is transferred into suitable transport vehicles, for example silo vehicles, for further transport. For further transport the prepared foam may additionally be compressed to achieve a higher mass-to-volume ratio. The foam is then transferred into the reaction apparatus provided for the chemolysis at the location of the chemolysis. It is also conceivable to connect the employed transport vehicle directly to the reaction apparatuses.

Chemolysis of the Polyurethane Foam to Obtain the First Product Mixture

Step (B) of the process according to the invention includes the chemolysis of the polyurethane foam provided in step (A).

The chemolysis is preferably carried out in the absence of oxygen. This is to be understood as meaning that the reaction is carried out in an inert gas atmosphere (especially in a nitrogen, argon or helium atmosphere). It is also preferable to free the employed chemolysis reagents (water and alcohol) of oxygen by inert gas saturation.

According to the invention step (B) is performed as a hydroalcoholysis. The term hydroalcoholysis used here is usually described as hydroglycolysisin the literature; cf. no. 3 above. However, since the term hydroglycolysis is correct only when using glycol as the alcohol, the more general term hydroalcoholysis is used in the context of the present invention.

The alcohol employed is preferably methanol, ethanol, ethylene glycol, diethylene glycol, propylene glycol, dipropylene glycol, methyl glycol, triethylene glycol, glycerol, 2-methyl-1,3-propanediol or a mixture of two or more of the aforementioned alcohols. Diethylene glycol and propylene glycol are particularly preferred. Water and alcohol may be premixed but this is not necessary.

The metal salt used as catalyst is preferably the salt of an alkali metal or alkaline earth metal, wherein sodium salts are particularly preferred. With regard to the anion of the metal salt, particular preference is given to carbonates, hydrogen carbonates, monohydrogen orthophosphates, orthophosphates and mixtures of two or more of these. It is very particularly preferable to employ a carbonate, a hydrogenarbonate or an orthophosphate (i.e. only one of the aforementioned compounds, and not a mixture, is used). It is especially preferable when the reaction employs no further catalysts that have not been mentioned above. It has proven advantageous to add the catalyst in such an amount that the mass thereof corresponds to 0.1% to 3.5% of the mass of the polyurethane foam to be converted in step (B).

According to the invention a reaction temperature in the range from 130° C. to 195° C. is maintained in step (B). The reaction temperature is preferably 135° C. to 190° C., particularly preferably 140° C. to 190° C. and very particularly preferably 165° C. to 185° C. Irrespective of the selected temperature it is preferable to perform the reaction at ambient pressure. However, a lower pressure (especially up to 900 $mbar_{(abs.)}$) or a higher pressure (especially up to 1800 $mbar_{(abs.)}$) is likewise possible. The reaction in step (B) is generally complete within a period of 1.0 h to 10 h, preferably 1.5 h to 7.5 h, particularly preferably 2.0 h to 6.0 h and very particularly preferably 2.5 h to 5.5 h, i.e. after a reaction duration within this period only a small amount, if any, of further reaction occurs.

As mentioned above it is advantageous not to add the water to be employed for the hydroalcoholysis in step (B), or at least not the entirety thereof, immediately at commencement of the reaction. It has proven advantageous to initially mix only a small proportion, namely 2% to 4%, if any, of the amount of water altogether to be employed in (B) with the remaining reactants (alcohol, catalyst and the polyurethane foam) and to add the remaining or entire amount of water over the reaction duration in the further course of step (B). The addition of the water for the hydrolytic cleavage of the carbamates formed as intermediates is carried out continuously or portionwise at intervals in such a way that the boiling temperature of the reaction mixture always remains in the specified ranges, in particular in the particularly preferred range of 165° C. to 185° C. The addition time of the water is preferably in the range from 1.0 hours to 5.0 hours (depending on the boiling point of the employed alcohol).

In a preferred embodiment a mass ratio of (altogether employed) alcohol and (altogether employed) water on the one hand to polyurethane foam on the other hand [m(alcohol+water)/m(polyurethane foam)] in the range from 1.1 to 1.3 is employed. If the water is added not at once but rather gradually as described above, this applies to the amount of water altogether employed in step (B).

The amount of water employed in step (B) is preferably 5.0% to 7.0% of the mass of the alcohol employed in step (B); this applies especially in connection with the above-mentioned range of 1.0 to 1.3 for the mass ratio [m(alcohol+water)/m(polyurethane foam)]. If the water is added not at once but rather gradually as described above, this applies to the amount of water altogether employed in step (B).

Step (B.II) may be performed in any reactor known for such a purpose in the technical field. Especially suitable chemolysis reactors are stirred tanks (stirred reactors) and tubular reactors.

Workup of the First Product Mixture

Step (B) provides a first product mixture containing
(at least) one amine corresponding to an isocyanate of the isocyanate component, polyols (namely the polyols making up the polyol component and/or polyols optionally formed from the original polyol component during reaction with the alcohol), (superstoichiometrically employed and thus incompletely converted) alcohol and (superstoichiometrically employed and thus incompletely converted) water.

In Step (C) this first product mixture is worked up to obtain a polyol phase containing the polyols and an amine phase containing the amine, water and the alcohol (separation of polyol and amine). It goes without saying for a person skilled in the art that this separation need not proceed perfectly in the sense that all of the polyol passes into the polyol phase and all of the amine (as well as all of the water and all of the alcohol) pass into the amine phase. If for example as a result of the prevailing solubility equilibria small amounts of the amine pass into the polyol phase (or small amounts of the polyol pass into the amine phase) this naturally does not depart from the scope of the present invention.

Due to the reaction mode in step (B) as a hydroalcoholysis the first product mixture is regularly biphasic. The two phases are an alcoholic-aqueous phase and an organic phase. Depending on the precise nature of the employed polyurethane foam and the alcohol employed in step (B) it is possible for the organic phase present in the first product mixture to contain the polyol and the alcoholic-aqueous phase present in the first product mixture to contain the amine in each case in a proportion such that the separation of amine and polyol in step (C) may be realized by a simple separation of the first mixture into an organic phase and into an alcoholic-aqueous phase. In this case the organic phase present in the first product mixture is the polyol phase sought in step (C) which may be directly supplied to step (D). In the same way the alcoholic-aqueous phase present in the first product mixture is then the amine phase sought in step (C) which—provided recovery of the amine is sought—may be directly supplied to step (E). This embodiment is conceivable for example in the case of TDI foams and performing the hydroalcoholysis with diethylene glycol as the alcohol since TDA is readily soluble in water and thus forms the alcoholic-aqueous phase together with the likewise water-soluble diethylene glycol while the recovered polyols form the organic phase. Whether this embodiment is employable may be easily determined through consideration by a person skilled in the art or simple preliminary experiments.

However, it is also possible for a simple phase separation of the first product mixture obtained in step (B) not to afford a polyol phase and an amine phase with sufficient polyol/amine proportions. In such a case it is preferable to extract the first product mixture in its entirety with an organic solvent. There are a number of options therefor.

In a preferred embodiment step (C) comprises combining the first product mixture obtained in step (B) with an organic solvent that is not completely miscible with the alcohol employed in step (B) and a phase separation into an alcohol phase which contains not only the alcohol but also the amine and water and in this embodiment corresponds to the amine phase and into a solvent phase which contains not only the solvent used for extraction but also the polyols and in this embodiment corresponds to the polyol phase. The requirement that the organic solvent to be used in step (C) is not completely miscible with the alcohol employed in step (B) means that—under the conditions of temperature and ratio of organic solvents to alcohol from step (B) that are prevailing for step (C)—there must be a miscibility gap such that a phase separation becomes possible. This is the case, for example, when the organic solvent is selected from aliphatic hydrocarbons, alicyclic hydrocarbons (for example cyclohexane), aromatic hydrocarbons (for example toluene) and mixtures of two or more of the aforementioned organic solvents and the alcohol is selected from methanol, ethanol, ethylene glycol, diethylene glycol, propylene glycol, dipropylene glycol, methyl glycol, triethylene glycol, glycerol, 2-methyl-1,3-propanediol and mixtures of two or more of the aforementioned alcohols.

In a further preferred embodiment step (C) comprises (C.I) mixing the first product mixture obtained in step (B) with an organic solvent that is miscible with the alcohol employed in step (B) to obtain a second product mixture and (C.II) washing the second product mixture obtained in step (C.I) with an aqueous washing liquid and phase separation into an aqueous phase which contains not only water but also the alcohol and the amine and in this embodiment corresponds to the amine phase and into a solvent phase which contains not only the solvent employed for extraction but also the polyols and in this embodiment corresponds to the polyol phase.

The requirement that the organic solvent to be employed in step (C.I) is miscible with the alcohol employed in step (B) means that—under the conditions of temperature and ratio of organic solvents to alcohol from step (B) that are prevailing for step (C.I)—a mixture of the organic solvent and the alcohol from step (B) does not spontaneously separate into two phases. This is the case, for example, when the organic solvent in step (C.I) is selected from halogen-substituted aliphatic hydrocarbons, halogen-substituted alicyclic hydrocarbons, halogen-substituted aromatic hydrocarbons and mixtures of two or more of the aforementioned organic solvents and the alcohol in step (B) is selected from methanol, ethanol, ethylene glycol, diethylene glycol, propylene glycol, dipropylene glycol, methyl glycol, triethylene glycol, glycerol, 2-methyl-1,3-propanediol and mixtures of two or more of the aforementioned alcohols.

Workup of the Polyol Phase

In step (D) the organic polyol phase obtained in step (C) is worked up to recover the polyols (isolation of the polyol). This is preferably performed by distillation and/or stripping with a stripping gas (such as in particular nitrogen or steam, preferably nitrogen). This involves performing a distillation, preferably in an evaporator selected from falling-film evaporators, thin-film evaporators, flash evaporators, rising-film evaporators, natural circulation evaporators, forced circulation evaporators or tank evaporators. It is particularly preferable for the distillation to be followed by a stripping operation with steam.

Stripping with steam may be performed by passing steam through stripping columns known per se. However, stripping with steam may also be effected such that water is added in liquid form to the polyol phase (that has optionally been prepurified in a distillation), the mixture is subsequently superheated (while maintaining a counterpressure sufficient to keep the water liquid using a pressure valve) and decompressed downstream of the pressure valve, with the result that the water present in the polyol evaporates and has a stripping effect.

Workup of the Amine Phase

It is preferable when in step (E) the aqueous amine phase obtained in step (C) is worked up to recover the amine (isolation of the amine).

Recovery of the amine preferably initially comprises distillative removal of alcohol and water from the amine phase. This may be accomplished by known distillation techniques. The remaining crude amine is worked up further, preferably by distillation. It is especially preferable to integrate the recovery of the amine into the workup of newly produced amine by mixing the crude amine with a crude product fraction of the amine deriving from new manufacture of the same amine. This embodiment provides an economic and environmentally friendly outlet for impurities deriving from the polyurethane product. It is described in more detail in international patent application WO 2020/260387 A1.

EXAMPLES

Reaction conversion was verified by determining the amine number of the reaction mixture after the hydroglycolysis. The acid number indicates how many mg of potassium hydroxide are required to neutralize the free organic amines present in 1 g of substance. Primary, secondary and tertiary amino groups are captured. The amino groups are weak bases. The solvent employed is concentrated acetic acid (glacial acetic acid, 99% to 100%). The amine is protonated by the solvent and thus converted into the corresponding acid which is now present as an ion pair with the deprotonated acid of the glacial acetic acid. The mixture is subsequently titrated with 0.1 molar perchloric acid as the titrant, wherein the perchloric acid displaces the anion of the solvent (glacial acetic acid). The perchloric acid consumed in the process is equated to the consumption of potassium hydroxide. The amine number is typically reported in Milligrams of KOH per gram of analyzed sample and is calculated according to:

$$\frac{AZ}{mg \cdot g^{-1}} = \frac{\frac{V}{ml} \cdot \left[ b_i / \left( mol \cdot l^{-1} \right) \right] \cdot \left[ M(KOH) / \left( g \cdot mol^{-1} \right) \right] \cdot f}{\frac{m}{g}}$$

where

AZ represents the amine number,

V represents the volume of consumed perchloric acid solution, m represents the mass of the titrated sample, M(KOH) represents the molar mass of KOH (56.11 g×mol$^{-1}$), $b_i$ the present similarity of the perchloric acid solution and f represents the dimensionless factor (titre) of the perchloric acid solution.

Example 1

In a 1000 mL 4-necked flask fitted with a stirrer, thermometer and cooler 300 g of diethylene glycol and 5.5 g of sodium carbonate are initially charged and heated to 180° C. under nitrogen. 300 g of flexible PU foam having the composition reported in table 1 are added and dissolved with stirring. After dissolution, the mixture was stirred at 180° C. for 2 hours and then in a period of 1 hour 16.5 g of water are added such that the reaction temperature does not fall below 170° C. After completion of the water addition the mixture is stirred at 180° C. for a further 2 hours and the reaction conversion is determined via the amine number as described above. The amine number for the reaction mixture theoretically expected in case of complete recovery of all amine is 86.0 mg KOH/g.

Amine number (measured) of the reaction mixture: 93.0 mgKOH/g

In a $^1$H-NMR spectrum of the reaction mixture TDI-based carbonates for no longer detected, rather only TDA.

TABLE 1

Formulation of flexible polyurethane foam reacted in example 1 (reported in parts by weight)

| | |
|---|---|
| Polyol Arcol 1108 (1) | 72.4 |
| Water | 1.8 |
| Tegostab BF 2370 (2) | 0.9 |
| Dabco T9 (3) | 0.1 |
| Niax A1 (4) | 0.06 |
| TDI 80 (5) | 24.7 |
| Index (6) | 108 |

(1) Polyether polyol from Covestro Deutschland AG
(2) Polyethersiloxane additive from Evonik AG
(3) DABCO T9 is a tin octoate catalyst from Evonik AG
(4) Niax A1 is an amine catalyst from Momentive Performance Materials
(5) TDI 80 is a tolylene diisocyanate from Covestro Deutschland AG
(6) Ratio of NCO to OH groups

Examples 3 to 7

Further experiments were performed using other catalysts than in the example 1 but otherwise the same procedure. The results are summarized in table 2.

TABLE 2

Further experiments analogous to example 1 with other catalysts.

| | Ex. 2 (inv.) | Ex. 3 (inv.) | Ex. 4 (inv.) | Example 5 (Comp.) | Ex. 6 (inv.) | Ex. 7 (comp.) |
|---|---|---|---|---|---|---|
| m(Na$_2$CO$_3$)/g | 0 | 0 | 3.0 | 0 | 0 | 0 |
| m(Na$_3$PO$_4$)/g | 4.5 | 9.3 | 0 | 0 | 0 | 0 |
| m(Na$_2$HPO$_4$)/g | 0 | 0 | 0 | 0 | 7.2 | 0 |
| m(NaOCH$_3$)/g (30% in MeOH) | 0 | 0 | 0 | 5.0 | 0 | 0 |
| Na polyphosphate | 0 | 0 | 0 | 0 | 0 | 9.0 |

TABLE 2-continued

Further experiments analogous to example 1 with other catalysts.

| | Ex. 2 (inv.) | Ex. 3 (inv.) | Ex. 4 (inv.) | Example 5 (Comp.) | Ex. 6 (inv.) | Ex. 7 (comp.) |
|---|---|---|---|---|---|---|
| Amine number (mg KOH/g) (measured) | 91.8 | 102 | 88.2 | 103 | 88.0 | 55.0 |

Key: inv. = according to the invention.

In comparative example 5 solid deposits were formed on the reaction vessel and conversion was incomplete. In comparative example 7 the amine number was much too low.

Example 8: Production of a Flexible Foam from the r-Polyether Polyol

The polyol was recovered as follows from the reaction mixture generated in example 1 ("r-polyether polyol"):

The reaction mixture was admixed with 3 parts by weight of cyclohexane and vigorously homogenized. In a separating funnel the mixture separated into 2 phases, an organic cyclohexane-polyether phase and a diethylene glycol-amine phase. The organic phase was separated, the solvent removed by distillation and the r-polyol thus recovered. The resulting r-polyether polyol was used to produce flexible foams and these were compared with flexible foams based only on the original polyether polyol Arcol 1108. Table 3 reports the formulations used and table 4 compares the results.

TABLE 3

Employed flexible foam formulations (reported in parts by weight)

| | Ex. 9 (reference) | Ex. 10 | Ex. 11 | Ex. 12 (reference) | Ex. 13 |
|---|---|---|---|---|---|
| Arcol 1108 | 72.4 | 0 | 36.0 | 72.4 | 0 |
| r-Polyol from Ex. 1 | 0 | 71.7 | 36.0 | 0 | 71.6 |
| Water | 1.8 | 1.8 | 1.8 | 1.8 | 1.8 |
| Tegostab BF 2370 | 0.9 | 0.9 | 0.9 | 0.9 | 0.9 |
| DABCO T9 | 0.1 | 0.1 | 0.1 | 0.14 | 0.14 |
| Niax A1 | 0.06 | 0.06 | 0.06 | 0.07 | 0.07 |
| TDI 80 | 24.7 | 25.5 | 25.1 | 24.7 | 25.5 |
| Index | 108 | 108 | 108 | 108 | 108 |

TABLE 4

Comparison of results

| Measured parameter | Units | Ex. 9 (reference) | Ex. 10 | Ex. 11 | Ex. 12 (reference) | Ex. 13 |
|---|---|---|---|---|---|---|
| Foam height | cm | 15 | 18 | 17 | 15 | 18 |
| Cream time | s | | 15 | 15 | 15 | 12 |
| Rise time complete | s | | 150 | 140 | 128 | 135 |
| Shrinkage at RT | | 1 | 1 | 1 | 1 | 1 |
| Internal cracking | | no | yes | no | no | no |
| Apparent density | kg/m$^3$ | 31.3 | | 33.1 | 37.5 | 29.8 |
| Air permeability | mm H$_2$O column | 350 | | 92 | 350 | 107 |
| Resilience: | % | 42 | | 43 | 39 | 40 |
| Compression hardness at 40% height | MPa | 23.34 | | 23.44 | 40.45 | 25.90 |

Key:

Cream time: Determined when the mixture is in the wood mold. This is the time elapsed between commencement of mixing (polyol component with the isocyanate component) and visible commencement of foaming.

Rise time: Determined when the mixture is in the wood mold. This is the time elapsed between commencing mixing (polyol component with the isocyanate component) and achieving the final height of the foam.

Blowoff: Refers to outgassing and formation of open-cell character after achieving the final height of the foam.

Shrinkage at RT (room temperature): 1=foam slightly shrunk at the sides.

Air permeability: The apparatus used to measure the air permeability consists of a glass cylinder having a millimeter scale from 0 to 350, whose internal diameter is 36 mm, and an inner tube with an inside diameter of 7 mm. This inner tube terminates at the top in a T-piece which has the air feed attached to it on one side and the hose with the measuring head attached to it on the other side. The hose for the measuring head has an internal diameter of 12 mm and a length of 1.80 m. The glass cylinder is closed at the bottom and can be filled with water via the funnel attached towards the back. The test instrument is connected via two taps, a pressure reducer and a hose of any length and any diameter to a compressed air source, wherein the pressure reducer is set to about 3.0 bar(abs).

As is apparent the recovered r-polyol may be re-employed in a flexible foam formulation as polyether polyol after the chemical recycling process in an amount of up to 100%. The visual properties and the cream and rise time of the examples when using the r-polyol show comparable behavior relative to the reference examples. The mechanical properties such as resilience and compressive strength of the r-polyol are comparable to the reference polyether polyol. The lower values in air permeability for Examples 8 and 10, in which the r-polyol was employed, show a higher open-cell content compared to reference examples 6 and 9.

The invention claimed is:

1. A process for recovering raw materials from a polyurethane foam, comprising:

(A) providing a polyurethane foam that is based on an isocyanate component and a polyol component;

(B) conducting chemolysis of the polyurethane foam with an alcohol and water in the presence of a catalyst at a temperature of 130° C. to 195° C., wherein the mass ratio of alcohol and water to the polyurethane foam is in the range from 0.5 to 2.5 and the mass of the water is 4.0% to 10% of the mass of the alcohol, to obtain a first product mixture containing an amine corresponding to an isocyanate of the isocyanate component, polyols, alcohol and water, and wherein the catalyst comprises a metal salt selected from a carbonate, a hydrogencarbonate, an orthophosphate, a monohydrogen orthophosphate, a metaphosphate or a mixture of any two or more thereof;

(C) working up the first product mixture to obtain a polyol phase containing the polyols and an amine phase containing the amine, water and the alcohol;

(D) recovering the polyols from the polyol phase; and (E) optionally recovering the amine from the amine phase.

2. The process as claimed in claim 1, wherein the isocyanate component comprises tolylene diisocyanate, a di- and/or polyisocyanate of the diphenylmethane series, pentane 1,5-diisocyanate, hexamethylene 1,6-diisocyanate, isophorone diisocyanate, xylylene diisocyanate, or a mixture of any two or more thereof.

3. The process as claimed in claim 2, wherein the isocyanate component comprises tolylene diisocyanate or a mixture of tolylene diisocyanate and the di- and/or polyisocyanate of the diphenylmethane series.

4. The process as claimed in claim 3, wherein the isocyanate component comprises tolylene diisocyanate.

5. The process as claimed in claim 4, with the proviso that the isocyanate component comprises no further isocyanates in addition to tolylene diisocyanate.

6. The process as claimed in claim 1, wherein the polyol component comprises a polyether polyol, a polyester polyol, a polyetherester polyol, a polyacrylate polyol, a polyethercarbonate polyol, or a combination of any two or more thereof.

7. The process as claimed in claim 1, wherein the polyol component comprises a styrene-acrylonitrile copolymer-filled polyether polyol.

8. The process as claimed in claim 1, wherein the alcohol comprises methanol, ethanol, ethylene glycol, diethylene glycol, propylene glycol, dipropylene glycol, methyl glycol, triethylene glycol, glycerol, 2-methylpropane-1,3-diol, or a mixture of any two or more thereof.

9. The process as claimed in claim 1, wherein the metal salt comprises a salt of an alkali metal or alkaline earth metal.

10. The process as claimed in claim 1, wherein the metal salt comprises a carbonate, a hydrogencarbonate, a monohydrogen orthophosphate, an orthophosphate, or a mixture of any two or more thereof.

11. The process as claimed in claim 10, with the proviso that the metal salt comprises only one metal salt.

12. The process as claimed in claim 1, wherein the mass of the catalyst is 0.1% to 3.5% of the mass of the polyurethane foam employed in step (B).

13. The process as claimed in claim 1, wherein step (C) comprises:

phase separation of the first product mixture into the polyol phase and into the amine phase; or wherein step (C) comprises:

combining the first product mixture with an organic solvent that is not completely miscible with the alcohol employed in step (B) and phase separation into the polyol phase and into the amine phase; or wherein step (C) comprises:

(C.I) mixing the first product mixture obtained in step (B) with an organic solvent that is miscible with the alcohol employed in step (B) to obtain a second product mixture and (C.II) washing the second product mixture obtained in step (C.I) with an aqueous washing liquid and phase separation into the amine phase and into the polyol phase.

14. The process as claimed in claim 1, wherein step (D) comprises a distillation and/or stripping with a stripping gas.

15. The process as claimed in claim 1, wherein step (E) is performed and comprises a distillative removal of alcohol and water from the amine phase followed by a distillative purification of the amine remaining after the distillative removal.

16. The process as claimed in claim 1, wherein step (B) comprises (i) transurethanization by reaction of urethane groups of the polyurethane foam with the alcohol to produce a carbamate intermediate, and (ii) subsequent in-situ hydrolysis of the carbamate intermediate by reaction of the carbamate intermediate with water, in which (i) and (ii) are both conducted in the presence of the same catalyst.

* * * * *